(12) United States Patent
Chang et al.

(10) Patent No.: US 12,087,190 B2
(45) Date of Patent: Sep. 10, 2024

(54) SYSTEM FOR CALIBRATING WAVEGUIDE-BASED HOLOGRAPHIC HEAD-UP DISPLAY

(71) Applicant: GM Global Technology Operations LLC, Detroit, MI (US)

(72) Inventors: Kai-Han Chang, Sterling Heights, MI (US); Thomas A. Seder, Fraser, MI (US); Manoj Sharma, Troy, MI (US)

(73) Assignee: GM GLOBAL TEACHNOLOGY OPERATIONS LLC, Detroit, MI (US)

( * ) Notice: Subject to any disclaimer, the term of this patent is extended or adjusted under 35 U.S.C. 154(b) by 179 days.

(21) Appl. No.: 17/814,661

(22) Filed: Jul. 25, 2022

(65) Prior Publication Data

US 2024/0029599 A1 Jan. 25, 2024

(51) Int. Cl.
| | |
|---|---|
| *G09G 3/00* | (2006.01) |
| *B60K 35/00* | (2024.01) |
| *G02B 5/02* | (2006.01) |
| *G02B 27/01* | (2006.01) |
| *G02B 27/36* | (2006.01) |
| *G06T 5/00* | (2024.01) |
| *G06T 5/80* | (2024.01) |
| *B60K 35/23* | (2024.01) |
| *B60K 35/81* | (2024.01) |

(52) U.S. Cl.
CPC ............ *G09G 3/002* (2013.01); *B60K 35/00* (2013.01); *G02B 5/0284* (2013.01); *G02B 27/0103* (2013.01); *G02B 27/36* (2013.01); *G06T 5/80* (2024.01); *B60K 35/23* (2024.01); *B60K 35/81* (2024.01); *B60K 2360/21* (2024.01); *B60K 2360/29* (2024.01); *G02B 2027/011* (2013.01); *G02B 2027/0138* (2013.01); *G09G 2320/0693* (2013.01); *G09G 2380/10* (2013.01)

(58) Field of Classification Search
CPC ........... G09G 3/002; G09G 2320/0693; G09G 2380/10; G06T 5/80; B60K 35/00; B60K 2360/21; B60K 35/81; B60K 35/23; B60K 2360/29; G02B 5/0284; G02B 27/0103; G02B 27/36; G02B 2027/011; G02B 2027/0138

See application file for complete search history.

(56) References Cited

U.S. PATENT DOCUMENTS

| | | | |
|---|---|---|---|
| 2018/0253907 A1* | 9/2018 | Cashen | ...................... G06T 7/50 |
| 2020/0132983 A1* | 4/2020 | Ogino | .................. G02B 26/125 |

(Continued)

*Primary Examiner* — Kwang-Su Yang
(74) *Attorney, Agent, or Firm* — Vivacqua Crane, PLLC

(57) ABSTRACT

A system for calibrating a waveguide-based holographic head-up display that projects images upon a windscreen of a vehicle including a light-diffusing panel positioned at the center of an eyellipse to reflect the images projected by the waveguide-based holographic head-up display. An eyebox of the waveguide-based holographic head-up display is positioned at the center of the eyellipse, and the eyebox is divided into a plurality of unit exit pupils. The system also includes a camera positioned to capture the images reflected by the light-diffusing panel and one or more controllers in electronic communication with the waveguide-based holographic head-up display and the camera. The one or more controllers execute instructions to determine a warp map based on a plurality of corrected individual calibration patterns.

20 Claims, 6 Drawing Sheets

(56) References Cited

U.S. PATENT DOCUMENTS

| | | | |
|---|---|---|---|
| 2020/0371351 A1* | 11/2020 | Chang | G02B 27/0101 |
| 2021/0157135 A1* | 5/2021 | Wells | B60K 35/00 |
| 2021/0400169 A1* | 12/2021 | Collin | G03H 1/2294 |
| 2023/0333374 A1* | 10/2023 | Collings | G02B 27/0081 |

* cited by examiner

|     |     |     |     |     |     |     |
|-----|-----|-----|-----|-----|-----|-----|
| 102 | 102 | 102 | 102 | 102 | 102 | 102 |
| 102 | 102 | 102 | 102 | 102 | 102 | 102 |
| 102 | 102 | 102 | 102 | 102 | 102 | 102 |
| 102 | 102 | 102 | 102 | 102 | 102 | 102 |
| 102 | 102 | 102 | 102 | 102 | 102 | 102 |
| 102 | 102 | 102 | 102 | 102 | 102 | 102 |
| 102 | 102 | 102 | 102 | 102 | 102 | 102 |
| 102 | 102 | 102 | 102 | 102 | 102 | 102 |
| 102 | 102 | 102 | 102 | 102 | 102 | 102 |

FIG. 5

| $(\Delta x, \Delta y)_{1,1}$ | $(\Delta x, \Delta y)_{1,2}$ | $(\Delta x, \Delta y)_{1,3}$ | $(\Delta x, \Delta y)_{1,4}$ | $(\Delta x, \Delta y)_{1,5}$ | $(\Delta x, \Delta y)_{1,6}$ | $(\Delta x, \Delta y)_{1,7}$ |
|---|---|---|---|---|---|---|
| $(\Delta x, \Delta y)_{2,1}$ | $(\Delta x, \Delta y)_{2,2}$ | $(\Delta x, \Delta y)_{2,3}$ | $(\Delta x, \Delta y)_{2,4}$ | $(\Delta x, \Delta y)_{2,5}$ | $(\Delta x, \Delta y)_{2,6}$ | $(\Delta x, \Delta y)_{2,7}$ |
| $(\Delta x, \Delta y)_{3,1}$ | $(\Delta x, \Delta y)_{3,2}$ | $(\Delta x, \Delta y)_{3,3}$ | $(0, 0)_{3,4}$ | $(\Delta x, \Delta y)_{3,5}$ | $(\Delta x, \Delta y)_{3,6}$ | $(\Delta x, \Delta y)_{3,7}$ |
| $(\Delta x, \Delta y)_{4,1}$ | $(\Delta x, \Delta y)_{4,2}$ | $(\Delta x, \Delta y)_{4,3}$ | $(\Delta x, \Delta y)_{4,4}$ | $(\Delta x, \Delta y)_{4,5}$ | $(\Delta x, \Delta y)_{4,6}$ | $(\Delta x, \Delta y)_{4,7}$ |
| $(\Delta x, \Delta y)_{5,1}$ | $(\Delta x, \Delta y)_{5,2}$ | $(\Delta x, \Delta y)_{5,3}$ | $(\Delta x, \Delta y)_{5,4}$ | $(\Delta x, \Delta y)_{5,5}$ | $(\Delta x, \Delta y)_{5,6}$ | $(\Delta x, \Delta y)_{5,7}$ |

FIG. 6

SYSTEM FOR CALIBRATING WAVEGUIDE-BASED HOLOGRAPHIC HEAD-UP DISPLAY

The present disclosure relates to a system for calibrating a waveguide-based holographic head-up display.

A head-up display (HUD) shows information such as, for example, vehicle speed and navigational instructions, directly onto a windscreen of a vehicle, within the driver's forward field of view. Accordingly, the head-up display provides drivers with information without looking away from the road. In some instances, head-up displays may be employed in augmented reality displays that overlay images on the windscreen to enhance a driver's view of the environment outside the vehicle and require precision alignment of the images relative to the driver.

After the head-up display is installed into the vehicle at a final assembly plant, an end-of-line calibration is performed to account for distortions that are introduced by variations in the windscreen. During the end-of-line calibration a warp map, which may also be referred to as a distortion compensation map, is calculated. The warp map yields a shaped or pre-distorted image that accounts for variations in the shape of the windscreen, wherein the pre-distorted image is then projected upon the windscreen. The end-of-line calibration at the final assembly plant may utilize a camera that is mounted upon a robotic arm. During calibration, the robotic arm moves the camera into different positions within an eyebox of the head-up display located within the interior cabin of the vehicle to capture images that are projected upon the windscreen by the head-up display. The warp map is calculated to compensate for the image artifacts at different positions within the eyebox. However, manipulating the camera into different angles by the robotic arm requires a relatively long tact time. Such a relatively long tact time may become difficult to accommodate in some instances, especially when there is only limited time on the assembly line.

Thus, while current approaches to calibrate a head-up display achieve their intended purpose, there is a need in the art for an improved system to calibrate a head-up display in a reduced amount of time.

SUMMARY

According to several aspects, a system for calibrating a waveguide-based holographic head-up display that projects images upon a windscreen of a vehicle is disclosed. The system includes a light-diffusing panel positioned at the center of an eyellipse to reflect the images projected by the waveguide-based holographic head-up display, wherein an eyebox of the waveguide-based holographic head-up display is positioned at the center of the eyellipse, and the eyebox is divided into a plurality of unit exit pupils. The system also includes a camera positioned to capture the images reflected by the light-diffusing panel. The system also includes one or more controllers in electronic communication with the waveguide-based holographic head-up display and the camera. The one or more controllers execute instructions to instruct the waveguide-based holographic head-up display to generate a calibration graphic upon the windscreen of the vehicle, wherein the calibration graphic includes a plurality of individual calibration patterns, each of which coincides with one of the plurality of unit exit pupils of the eyebox. The one or more controllers execute instructions to receive image data from the camera, wherein the image data captures the calibration graphic that is reflected upon the light-diffusing panel, and wherein the calibration graphic reflected upon the light-diffusing panel includes a plurality of warped individual calibration patterns. The one or more controllers execute instructions to correct distortions in each of the plurality of warped individual calibration patterns of the calibration graphic to create a plurality of corrected individual calibration patterns. The one or more controllers determine a warp map based on the plurality of corrected individual calibration patterns.

In an aspect, at least one fiducial alignment mark is disposed along a light-diffusing surface of the light-diffusing panel.

In another aspect, the light-diffusing panel is positioned in place by aligning the fiducial alignment mark of the light-diffusing surface relative to the center of the eyellipse.

In yet another aspect, the one or more controllers execute instructions to determine a misalignment of the calibration graphic relative to the center of the eyellipse.

In one aspect, the one or more controllers execute instructions to instruct the waveguide-based holographic head-up display to align the calibration graphic with the center of the eyellipse, wherein once the calibration graphic is aligned with the center of the eyellipse, a center of each warped individual calibration pattern of the calibration graphic is aligned with a center of a corresponding corrected individual calibration pattern.

In another aspect, in response to determining that the center of each of a plurality of warped individual calibration patterns is aligned with the center of the corresponding corrected individual calibration pattern, the one or more controllers correct distortions in a remaining portion of each of the plurality of warped individual calibration patterns of the calibration graphic.

In yet another aspect, correcting the distortions in the remaining portion of each of the warped individual calibration patterns includes aligning a remaining portion of a plurality of alignment marks that are part of each of the warped individual calibration patterns with a plurality of alignment marks that are part of the corresponding corrected individual calibration pattern.

In an aspect, the one or more controllers execute instructions to determine a difference in position between each of the plurality of alignment marks that are part of each of the warped individual calibration patterns and each of the alignment marks that are part of the corresponding corrected individual calibration pattern.

In another aspect, the warp map includes a plurality of individual unit exit pupil warp maps, each of which corresponds to one of the unit exit pupils of the eyebox.

In yet another aspect, each of the individual unit exit pupil warp maps includes a plurality of coordinates that each correspond to an alignment mark that is part of each of the individual calibration patterns.

In an aspect, each of the individual calibration patterns includes a symmetrical array of alignment marks that are arranged in corresponding rows and columns.

In another aspect, the alignment marks are dots.

In yet another aspect, the waveguide-based holographic head-up display includes a holographic projector and a waveguide, and the holographic projector includes a laser light source and a spatial light modulator.

In an aspect, a vehicle is disclosed. The vehicle includes a windscreen, a waveguide-based holographic head-up display that projects images upon the windscreen of the vehicle, and a system for calibrating the waveguide-based holographic head-up display. The system includes a light-diffusing panel positioned at the center of an eyellipse to reflect the images projected by the waveguide-based holographic head-up display, wherein an eyebox of the waveguide-based holographic head-up display is positioned at the center of an eyellipse of the light-diffusing panel, and wherein the eyebox is divided into a plurality of unit exit pupils. The system also includes a camera positioned to capture the images reflected by the light-diffusing panel. Finally, the system includes one or more controllers in electronic communication with the waveguide-based holographic head-up display and the camera, wherein the one or more controllers execute instructions to instruct the waveguide-based holographic head-up display to generate a calibration graphic upon the windscreen of the vehicle, wherein the calibration graphic includes a plurality of individual calibration patterns, each of which coincides with one of the plurality of unit exit pupils of the eyebox. The one or more controllers receive image data from the camera, wherein the image data captures the calibration graphic that is reflected upon the light-diffusing panel, and wherein the calibration graphic reflected upon the light-diffusing panel includes a plurality of warped individual calibration patterns. The one or more controllers correct distortions in each of the plurality of warped individual calibration patterns of the calibration graphic to create a plurality of corrected individual calibration patterns. Finally, the one or more controllers determine a warp map based on the plurality of corrected individual calibration patterns.

In another aspect, a method for calibrating a waveguide-based holographic head-up display that projects images upon a windscreen of a vehicle is disclosed. The method includes instructing the waveguide-based holographic head-up display to generate a calibration graphic upon the windscreen of the vehicle by one or more controllers, wherein the calibration graphic includes a plurality of individual calibration patterns, each of which coincides with one of a plurality of unit exit pupils of an eyebox, and wherein the eyebox of the waveguide-based holographic head-up display is positioned at the center of an eyellipse of the light-diffusing panel. The method also includes receiving, by the one or more controllers, image data from a camera, wherein the image data captures the calibration graphic that is reflected upon a light-diffusing panel, and wherein the calibration graphic reflected upon the light-diffusing panel includes a plurality of warped individual calibration patterns, and wherein the light-diffusing panel is positioned at the center of the eyellipse. The method includes correcting distortions in each of the plurality of warped individual calibration patterns of the calibration graphic to create a plurality of corrected individual calibration patterns. The method includes determining, by the one or more controllers, a warp map based on the plurality of corrected individual calibration patterns.

In another aspect, the method includes determining a misalignment of the calibration graphic relative to the center of the eyellipse.

In yet another aspect, the method includes instructing the waveguide-based holographic head-up display to align the calibration graphic with the center of the eyellipse, wherein once the calibration graphic is aligned with the center of the eyellipse, a center of each warped individual calibration pattern of the calibration graphic is aligned with a center of a corresponding corrected individual calibration pattern.

In an aspect, in response to determining that the center of each of a plurality of warped individual calibration patterns is aligned with the center of the corresponding corrected individual calibration pattern, the method includes correcting distortions in a remaining portion of each of the plurality of warped individual calibration patterns of the calibration graphic.

In another aspect, the method includes correcting the distortions in the remaining portion of each of the warped individual calibration patterns by aligning a remaining portion of a plurality of alignment marks that are part of each of the warped individual calibration patterns with a plurality of alignment marks that are part of the corresponding corrected individual calibration pattern.

In yet another aspect, the method includes determining a difference in position between each of the plurality of alignment marks that are part of each of the warped individual calibration patterns and each of the alignment marks that are part of the corresponding corrected individual calibration pattern.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

FIG. 5 is an illustration of an exemplary a warp map including a plurality of individual unit exit pupil warp maps, according to an exemplary embodiment;

FIG. 6 is an illustration of one of the individual unit exit pupil warp maps shown in FIG. 5, according to an exemplary embodiment.

DETAILED DESCRIPTION

The following description is merely exemplary in nature and is not intended to limit the present disclosure, application, or uses.

Figure 1:
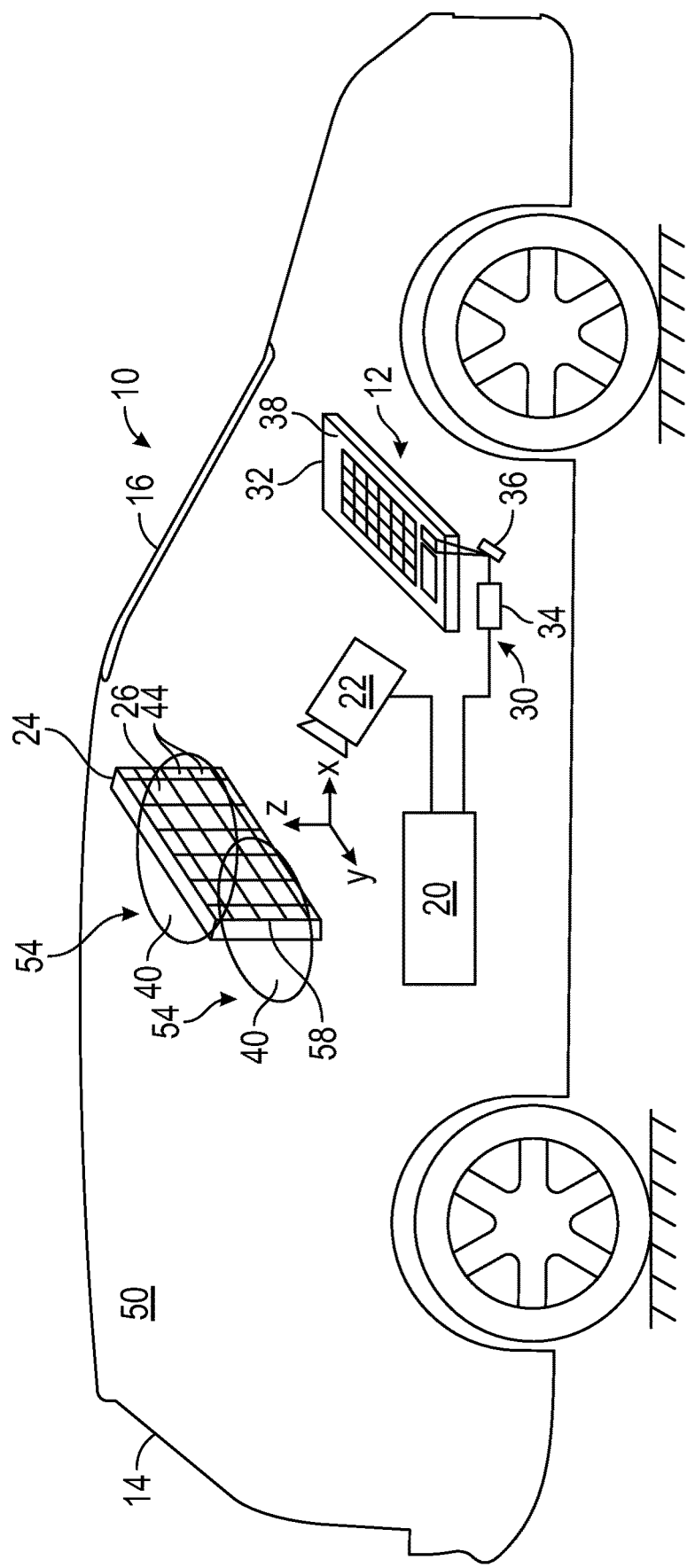
FIG. 1 is a schematic diagram of the disclosed system for calibrating a waveguide-based holographic head-up display system including a camera and a light-diffusing panel, according to an exemplary embodiment.

Referring to FIG. 1, an exemplary system 10 for calibrating a waveguide-based holographic head-up display 12 for a vehicle 14 is shown. The waveguide-based holographic head-up display 12 displays virtual images upon a windscreen 16 of the vehicle 14. It is to be appreciated that the vehicle 14 may be any type of vehicle such as, but not limited to, a sedan, truck, sport utility vehicle, van, or motor home. The system 10 includes the waveguide-based holographic head-up display 12, one or more controllers 20, a camera 22, and a light-diffusing panel 24. The light-diffusing panel 24 defines a light-diffusing surface 26. It is to be appreciated that the light-diffusing panel 24 is secured in place by a fixture (not illustrated) during calibration of the waveguide-based holographic head-up display 12 and is subsequently removed once calibration is complete. The one or more controllers 20 are in electronic communication with the waveguide-based holographic head-up display 12 and the camera 22. As explained below, the system 10 calibrates the waveguide-based holographic head-up display 12 by calculating a warp map 100 (seen in FIG. 5) that accounts for variations in the shape of the windscreen 16 of the vehicle 14. In one embodiment, the calibration of the waveguide-based holographic head-up display 12 is performed during end-of-line calibration at a final assembly plant. However, it is to be appreciated that the calibration may be performed at a dealership as well.

The waveguide-based holographic head-up display 12 includes a holographic projector 30 and a waveguide 32, wherein the holographic projector 30 includes a laser light source 34 and a spatial light modulator 36. The one or more controllers 20 are in electronic communication with the holographic projector 30. The spatial light modulator 36 is positioned between the laser light source 34 and the waveguide 32. The spatial light modulator 36 is configured to receive laser light from the laser light source 34 and project a holographic image into an exit pupil replicator 38 of the waveguide 32, wherein the holographic image propagates inside the exit pupil replicator 38 and is extracted multiple times before being projected towards the windscreen 16 as the virtual image. The one or more controllers 20 instruct the holographic projector 30 of the waveguide-based holographic head-up display 12 to generate the virtual images that are projected onto the windscreen 16.

Figure 2:
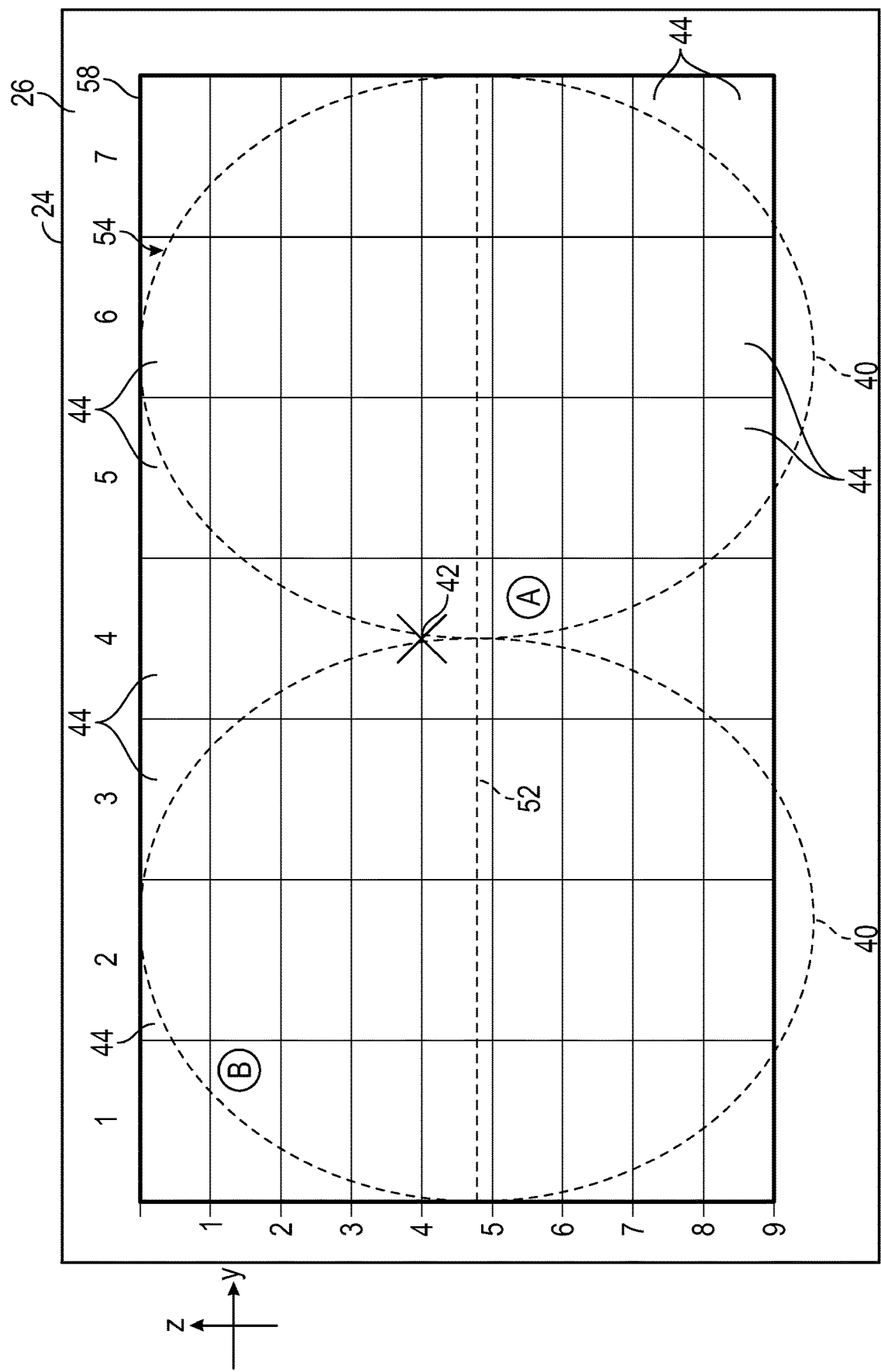
FIG. 2 is a front view of the light-diffusing panel, an eyellipse, and an eyebox including a plurality of unit exit pupils, according to an exemplary embodiment.

As mentioned above, a fixture (not shown) is used during calibration of the waveguide-based holographic head-up display 12 to secure the light-diffusing panel 24 in place within an interior cabin 50 of the vehicle 14. FIG. 2 is a front view of the light-diffusing panel 24. As seen in FIG. 2, at least one fiducial alignment mark 42 is disposed along the light-diffusing surface 26 of the light-diffusing panel 24. In the example as shown in FIG. 2, the at least one fiducial alignment mark 42 is a cross-hatch, however, it is to be appreciated that other types of fiducial marks may be used as well. The light-diffusing panel 24 is positioned in place by the fixture (not shown) by aligning the fiducial alignment mark 42 of the light-diffusing surface 26 relative to a center 52 of an eyellipse 54 of the waveguide-based holographic head-up display 12. In other words, the light-diffusing panel 24 is aligned in a y-z plane of a vehicle coordinate system to intersect the center 52 the eyellipse 54.

Referring to FIG. 1, the camera 22 is located within the interior cabin 50 of the vehicle 14 and is positioned to capture image data representing the virtual images reflected by the light-diffusing surface 26 of the light-diffusing panel 24 during calibration of the waveguide-based holographic head-up display 12. When the light-diffusing panel 24 is removed after the waveguide-based holographic head-up display 12 is calibrated and a driver is now seated in the vehicle 14, the camera 22 captures image data indicating a location of a head of a driver of the vehicle 14 as well as a position of the left and right eyes of the driver. In one non-limiting embodiment, the camera 22 is part of a driver monitoring system for the vehicle 14.

Referring to FIGS. 1 and 2, the eyellipse 54 includes two elliptical volumes 40 that each represent a potential location of either the right or the left eye of a driver of the vehicle 14 and is determined based on statistical data. An eyebox 58 of the waveguide-based holographic head-up display 12 is aligned with the center 52 of the eyellipse 54. It is to be appreciated that when the eyebox 58 is not aligned with the center 52 of the eyebox 58, the virtual image projected into the windscreen 16 by the waveguide-based holographic head-up display 12 may not be completely visible or may appear to be incorrectly positioned. The eyebox 58 represents a volume within the interior cabin 50 of the vehicle 14 in which a driver of the vehicle 14 may view the entire virtual image projected by the waveguide-based holographic head-up display 12. The eyebox 58 is divided into a plurality of unit exit pupils 44.

Referring to FIG. 2, the fiducial alignment mark 42 is disposed along the light-diffusing surface 26 of the light-diffusing panel 24. The fiducial alignment mark 42 positions the light-diffusing panel 24 so that each of the unit exit pupils 44 of the eyebox 58 are disposed along the light-diffusing surface 26. In other words, the fiducial alignment mark 42 ensures that each unit exit pupil 44 of the eyebox 58 is disposed along the light-diffusing surface 26 of the light-diffusing panel 24.

It is to be appreciated that the eyellipse 54 only represents a potential location of the eyes of a driver. However, FIG. 2 illustrates an actual position A of a right eye of the driver and an actual position B of the left eye of the driver within a respective elliptical volume 40 of the eyellipse 54. Each eye of the driver is located within a different unit exit pupil 44 of the eyebox 58. Specifically, in the example as shown in FIG. 2, the unit exit pupils 44 are divided into nine rows and seven columns, and the actual position A of the right eye is in unit exit pupil 44 located in the fourth row and sixth column, and the actual position B of the left eye is in unit exit pupil 44 located in the second row and the first column.

Referring to FIGS. 1-2, it is to be appreciated that because the actual positions A, B of the right and left eyes of the driver are in different locations (i.e., different unit exit pupils 44 of the eyebox 58), each eye will see a different distortion in the virtual image projected upon the windscreen 16 by the waveguide-based holographic head-up display 12. As explained below, the disclosed system 10 calibrates the waveguide-based holographic head-up display 12 by determining a warp map 100 that includes individual unit exit pupil warp map 102 (seen in FIG. 5) that each correspond to one of the exit unit pupils 44 of the eyebox 58, wherein the warp map 100 is saved in memory of the one or more controllers 20.

After the system 10 calibrates the waveguide-based holographic head-up display 12 and the light-diffusing panel 24 is removed, a driver may be seated within the vehicle 14, wherein the head of the driver is located within the eyebox 58. The camera 22 may then capture the location of the right and left eyes of the driver, and the one or more controllers 20 determine the unit exit pupils 44 that correspond to the actual positions A, B of the right and left eyes of the driver. The controller 20 may then select the individual unit exit pupil warp maps 102 (FIG. 5) corresponding to the unit exit pupils 44 that represent the actual positions A, B of the right and left eyes of the driver. Moreover, if the driver moves his or her head and the actual positions A, B of the driver's right and left eyes change, different individual unit exit pupil warp maps 102 may be selected to compensate for the changed position of the driver's head.

Figure 3A:
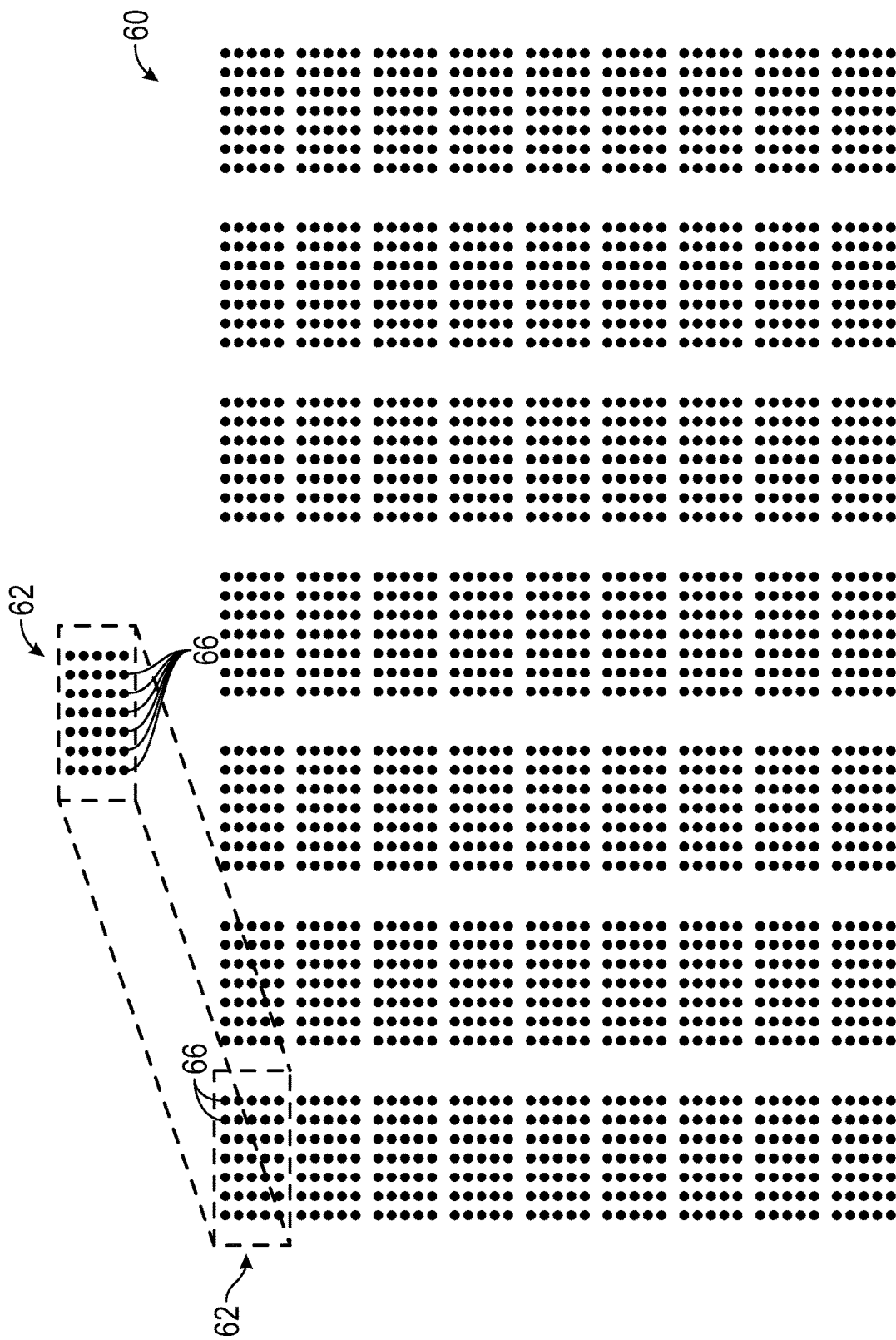
FIG. 3A illustrates an exemplary calibration graphic including a plurality of individual calibration patterns, each of which coincides with one of the unit exit pupils of the eyebox, according to an exemplary embodiment.
Figure 3B:
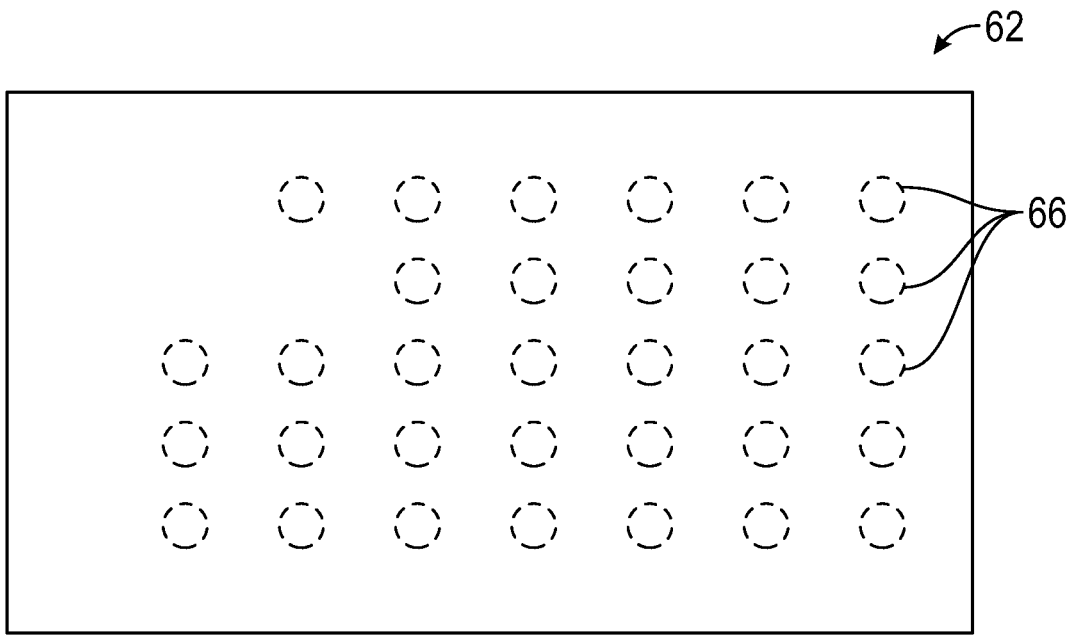
FIG. 3B illustrates an alternative embodiment of an individual calibration pattern, according to an exemplary embodiment.

FIG. 3A illustrates an exemplary calibration graphic 60 that is generated by the waveguide-based holographic head-up display 12 during calibration. As seen in FIG. 3A, the calibration graphic 60 includes a plurality of individual calibration patterns 62 that each coincide with one of the unit exit pupils 44 of the eyebox 58 shown in FIGS. 1-2. Each of the individual calibration patterns 62 includes a symmetrical array of alignment marks 66 that are arranged in corresponding rows and columns, wherein a size and spacing of the individual alignment marks 66 are saved in memory of the one or more controllers 20. In the non-limiting embodiment as shown in FIG. 3A, the individual alignment marks 66 are shown as dots, however, it is to be appreciated that FIG. 3A is merely exemplary in nature, and the calibration pattern 62 may include any type of pattern or graphic with a known size and spacing for calibrating and removing distortion from an image. Furthermore, although FIG. 3A illustrates a symmetrical array of dots, it is to be appreciated that the calibration pattern 62 may include a non-symmetrical pattern as well. For example, in the embodiment as shown in FIG. 3B, each of the individual calibration patterns 62 includes an asymmetrical array of alignment marks 66. Some examples of alternative individual calibration patterns 62 include, but are not limited to, a checkboard pattern and a grid pattern.

Referring to FIGS. 1 and 2, before calibrating the waveguide-based holographic head-up display 12, the light-diffusing panel 24 is positioned in place by aligning the fiducial alignment mark 42 of the light-diffusing surface 26 with the center 52 of the eyellipse 54. Referring to FIGS. 1 and 3A, the one or more controllers 20 may receive a prompt indicating the waveguide-based holographic head-up display 12 is to be calibrated. In response to receiving the prompt, the one or more controllers 20 instruct the waveguide-based holographic head-up display 12 to generate the calibration graphic 60 upon the windscreen 16 of the vehicle 14. The calibration graphic 60 is reflected by the light-diffusing surface 26 of the light-diffusing panel 24, and the camera 22 captures image data representing the calibration graphic 60 reflected by the light-diffusing surface 26 of the light-diffusing panel 24. The one or more controllers 20 receive the image data from the camera 22 representing the virtual images reflected by the light-diffusing surface 26 of the light-diffusing panel 24.

Figure 4:
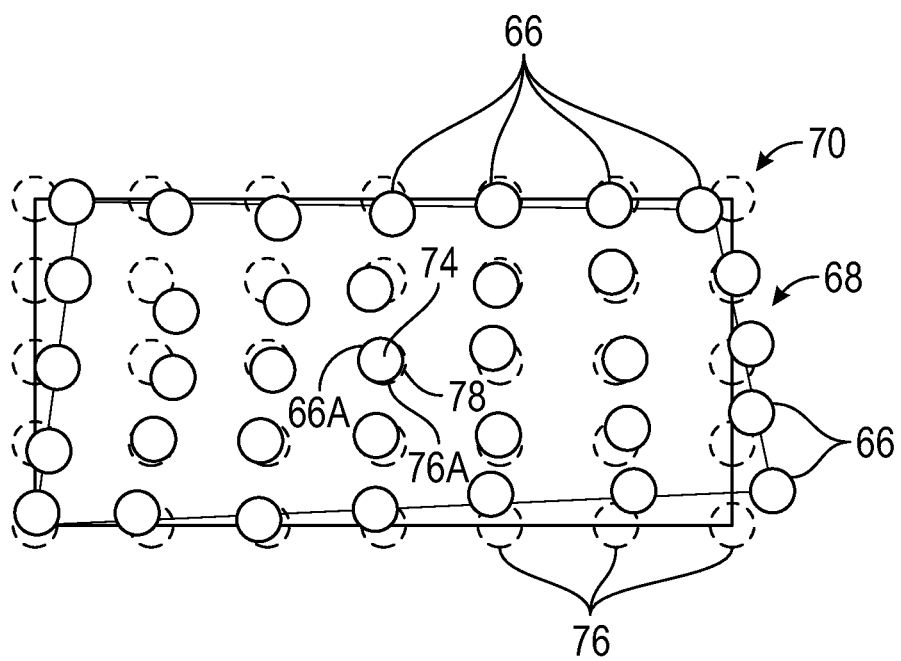
FIG. 4 illustrates an exemplary warped individual calibration pattern interposed upon a corrected calibration pattern, according to an exemplary embodiment.

It is to be appreciated that the calibration graphic 60 reflected by the light-diffusing panel 24 includes distortions that are created by variations in the shape of the windscreen 16 of the vehicle 14. Referring to FIGS. 1 and 4, the calibration graphic 60 (FIG. 3A) reflected by the light-diffusing panel 24 includes a plurality of warped individual calibration patterns 68, wherein FIG. 4 illustrates an exemplary warped individual calibration pattern 68 interposed upon a corrected calibration pattern 70, wherein the corrected calibration pattern 70 is identical to each of the individual calibration patterns 62 that coincides with one of the unit exit pupils 44 of the eyebox 58 (seen in FIG. 3A). As explained below, the one or more controllers 20 correct distortions in each of the plurality of warped individual calibration patterns 68 of the calibration graphic 60 to create the corrected individual calibration patterns 70. The one or more controllers 20 then determine the warp map 100 (FIG. 5) based on the plurality of corrected calibration patterns 70.

Referring to FIGS. 1, 2, and 3A, the one or more controllers 20 first determine a misalignment of the calibration graphic 60 (FIG. 3A) relative to the center 52 of the eyellipse 54 (FIG. 2). The one or more controllers 20 then instruct the waveguide-based holographic head-up display 12 to align the calibration graphic 60 with the center 52 of the eyellipse 54 based on the misalignment. As seen in FIG. 4, once the calibration graphic 60 is aligned with the center 52 of the eyellipse 54, a center 74 of each warped individual calibration pattern 68 is now aligned with a center 78 of a corresponding corrected individual calibration pattern 70. Specifically, in the example as shown in FIG. 4, the center 74 of the warped individual calibration pattern 68 includes a central alignment mark 66A that is aligned with a central alignment mark 76A of the corresponding corrected individual calibration pattern 70.

In response to determining that the center 74 of each warped individual calibration pattern 68 is aligned with the center 78 of the corrected individual calibration pattern 70, the one or more controllers 20 correct the distortions in a remaining portion of each of the plurality of warped individual calibration patterns 68 of the calibration graphic 60. Specifically, in the example as shown in FIG. 4, the remaining portion of each of the warped individual calibration patterns 68 includes each alignment mark 66 except the central alignment mark 66A. Correcting the distortions in the remaining portion of each of the warped individual calibration patterns 68 includes aligning the alignment marks 66 that are part of each of the warped individual calibration patterns 68 with the alignment marks 76 of the corresponding corrected individual calibration pattern 70. Once the distortions are removed from the remaining portion of each of the plurality of warped individual calibration patterns 68 of the calibration graphic 60 (FIG. 3A), the one or more controllers 20 may then determine a difference in position between each of the alignment marks 66 that are part of each of the warped individual calibration patterns 68 and each of the alignment marks 76 that are part of the corrected individual calibration pattern 70.

Referring now to FIG. 5, the warp map 100 includes individual unit exit pupil warp maps 102 that each correspond to one of the exit unit pupils 44 of the eyebox 58 (seen in FIG. 2). FIG. 6 is an illustration of an exemplary individual unit exit pupil warp map 102 that corresponds to one of the exit unit pupils 44 of the eyebox 58. The individual unit exit pupil warp map 102 includes a plurality of coordinates 104 that each correspond to one of the alignment marks 66 that are part of each of the individual calibration patterns 62. Each coordinate 104 includes an x coordinate and a y coordinate, wherein the x coordinate and the y coordinate represent the difference in position between an alignment mark 66 that is part of each of the warped individual calibration patterns 68 and an alignment mark 76 that is part of the corresponding corrected individual calibration pattern 70 (FIG. 4).

Figure 7:
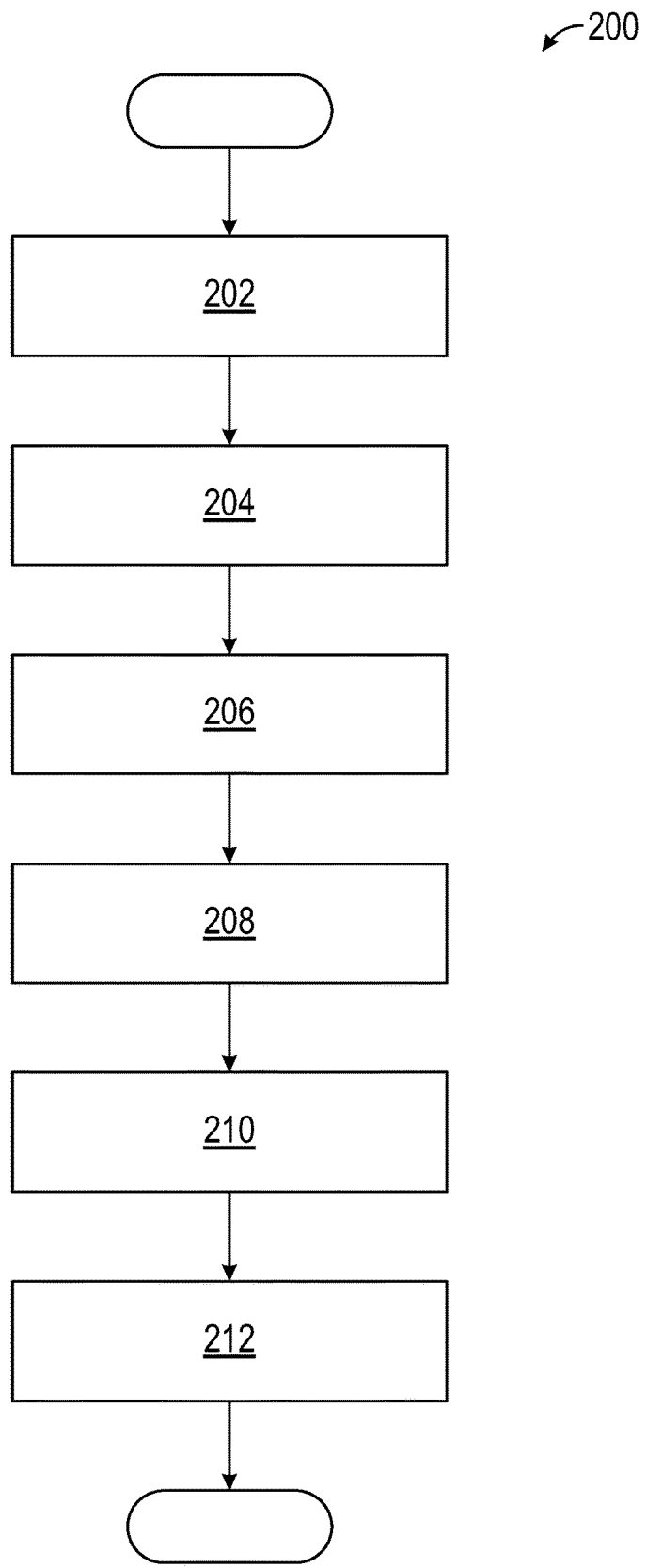
FIG. 7 is a process flow diagram illustrating a method for calibrating a waveguide-based holographic head-up display system, according to an exemplary embodiment.

FIG. 7 is a process flow diagram illustrating a method 200 for calibrating the waveguide-based holographic head-up display 12. Referring to FIGS. 1, 2, and 7, the method 200 may begin at block 202. In block 202, the light-diffusing panel 24 is positioned in place by the fixture (not shown) by aligning the fiducial alignment mark 42 of the light-diffusing surface 26 relative to the center 52 of the eyellipse 54. The method 200 may then proceed to block 204.

In block 204, the one or more controllers 20 receive a prompt indicating the waveguide-based holographic head-up display 12 is to be calibrated. The method 200 may then proceed to block 206.

In block 206, in response to receiving the prompt, the one or more controllers 20 instruct the waveguide-based holographic head-up display 12 to generate the calibration graphic 60 (FIG. 3A) upon the windscreen 16 of the vehicle 14. As mentioned above, the calibration graphic 60 reflected by the light-diffusing panel 24 includes a plurality of warped individual calibration patterns 68, which are shown in FIG. 4. The method 200 may then proceed to block 208.

In block 208, the one or more controllers 20 receive image data from the camera 22, wherein the image data captures the calibration graphic 60 (FIG. 3A) that is reflected upon the light-diffusing panel 24. The calibration graphic 60 reflected upon the light-diffusing panel 24 includes the plurality of warped individual calibration patterns 68 (FIG. 4). The method 200 may then proceed to block 210.

In block 210, the one or more controllers 20 correct distortions in each of the plurality of warped individual calibration patterns 68 (FIG. 4) of the calibration graphic 60 to create the plurality of corrected individual calibration patterns 70.

As mentioned above, correcting the distortions includes first determining the misalignment of the calibration graphic 60 (FIG. 3A) relative to the center 52 of the eyellipse 54 (FIG. 2), and then instructing the waveguide-based holographic head-up display 12 to align the calibration graphic 60 with the center 52 of the eyellipse 54 based on the misalignment. As seen in FIG. 4, the center 74 of each of the warped individual calibration patterns 68 includes the central alignment mark 66A that is aligned with the central alignment mark 76A of the corresponding corrected individual calibration pattern 70. In response to determining that the center 74 of each warped individual calibration pattern 68 is aligned with the center 78 of the corrected individual calibration pattern 70, the one or more controllers 20 correct the distortions in the remaining portion of each of the plurality of warped individual calibration patterns 68 of the calibration graphic 60. The method 200 may then proceed to block 212.

In block 212, the one or more controllers 20 determine the warp map 100 (FIG. 5) based on the plurality of corrected individual calibration patterns 70 (FIG. 4). The warp map 100 is saved in memory of the one or more controllers 20. The method 200 may then terminate.

Referring generally to the figures, the disclosed system for calibrating the waveguide-based holographic head-up display provides various technical effects and benefits. Specifically, the disclosure provides a relatively quick, cost-effective approach to determine a warp map for each exit unit pupil of the eyebox. The disclosed system results in reduced tact time when compared to conventional approaches that perform the end-of-line calibration to determine the warp map. The disclosed system also determines unique warp maps, each of which coincides with one of the plurality of unit exit pupils of the eyebox. Thus, once a driver is located within the eyebox, the system may select the warp maps that correspond to the unit exit pupils that represent the actual positions of the right and left eyes of the driver.

The controllers may refer to, or be part of an electronic circuit, a combinational logic circuit, a field programmable gate array (FPGA), a processor (shared, dedicated, or group) that executes code, or a combination of some or all of the above, such as in a system-on-chip. Additionally, the controllers may be microprocessor-based such as a computer having a at least one processor, memory (RAM and/or ROM), and associated input and output buses. The processor may operate under the control of an operating system that resides in memory. The operating system may manage computer resources so that computer program code embodied as one or more computer software applications, such as an application residing in memory, may have instructions executed by the processor. In an alternative embodiment, the processor may execute the application directly, in which case the operating system may be omitted.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A system for calibrating a waveguide-based holographic head-up display that projects images upon a windscreen of a vehicle, the system comprising:
    a light-diffusing panel positioned at the center of an eyellipse to reflect the images projected by the waveguide-based holographic head-up display, wherein an eyebox of the waveguide-based holographic head-up display is positioned at the center of the eyellipse, and wherein the eyebox is divided into a plurality of unit exit pupils;
    a camera positioned to capture the images reflected by the light-diffusing panel; and
    one or more controllers in electronic communication with the waveguide-based holographic head-up display and the camera, wherein the one or more controllers execute instructions to:
        instruct the waveguide-based holographic head-up display to generate a calibration graphic upon the windscreen of the vehicle, wherein the calibration graphic includes a plurality of individual calibration patterns, each of which coincides with one of the plurality of unit exit pupils of the eyebox;
        receive image data from the camera, wherein the image data captures the calibration graphic that is reflected upon the light-diffusing panel, and wherein the calibration graphic reflected upon the light-diffusing panel includes a plurality of warped individual calibration patterns;
        correct distortions in each of the plurality of warped individual calibration patterns of the calibration graphic to create a plurality of corrected individual calibration patterns; and
        determine a warp map based on the plurality of corrected individual calibration patterns.

2. The system of claim 1, wherein at least one fiducial alignment mark is disposed along a light-diffusing surface of the light-diffusing panel.

3. The system of claim 2, wherein the light-diffusing panel is positioned in place by aligning the fiducial alignment mark of the light-diffusing surface relative to the center of the eyellipse.

4. The system of claim 1, wherein the one or more controllers execute instructions to:
    determine a misalignment of the calibration graphic relative to the center of the eyellipse.

5. The system of claim 4, wherein the one or more controllers execute instructions to:
    instruct the waveguide-based holographic head-up display to align the calibration graphic with the center of the eyellipse, wherein once the calibration graphic is aligned with the center of the eyellipse, a center of each warped individual calibration pattern of the calibration graphic is aligned with a center of a corresponding corrected individual calibration pattern.

6. The system of claim 5, wherein the one or more controllers execute instructions to:
    in response to determining that the center of each of a plurality of warped individual calibration patterns is aligned with the center of the corresponding corrected individual calibration pattern, correct distortions in a remaining portion of each of the plurality of warped individual calibration patterns of the calibration graphic.

7. The system of claim 6, wherein correcting the distortions in the remaining portion of each of the warped individual calibration patterns includes aligning a remaining portion of a plurality of alignment marks that are part of each of the warped individual calibration patterns with a plurality of alignment marks that are part of the corresponding corrected individual calibration pattern.

8. The system of claim 7, wherein the one or more controllers execute instructions to:
determine a difference in position between each of the plurality of alignment marks that are part of each of the warped individual calibration patterns and each of the alignment marks that are part of the corresponding corrected individual calibration pattern.

9. The system of claim 1, wherein the warp map includes a plurality of individual unit exit pupil warp maps, each of which corresponds to one of the unit exit pupils of the eyebox.

10. The system of claim 9, wherein each of the individual unit exit pupil warp maps includes a plurality of coordinates that each correspond to an alignment mark that is part of each of the individual calibration patterns.

11. The system of claim 9, wherein each of the individual calibration patterns includes a symmetrical array of alignment marks that are arranged in corresponding rows and columns.

12. The system of claim 11, wherein the alignment marks are dots.

13. The system of claim 1, wherein the waveguide-based holographic head-up display includes a holographic projector and a waveguide, and wherein the holographic projector includes a laser light source and a spatial light modulator.

14. A vehicle, comprising:
a windscreen;
a waveguide-based holographic head-up display that projects images upon the windscreen of the vehicle; and
a system for calibrating the waveguide-based holographic head-up display, comprising:
a light-diffusing panel positioned at the center of an eyellipse to reflect the images projected by the waveguide-based holographic head-up display, wherein an eyebox of the waveguide-based holographic head-up display is positioned at the center of the eyellipse the light-diffusing panel, and wherein the eyebox is divided into a plurality of unit exit pupils;
a camera positioned to capture the images reflected by the light-diffusing panel; and
one or more controllers in electronic communication with the waveguide-based holographic head-up display and the camera, wherein the one or more controllers execute instructions to:
instruct the waveguide-based holographic head-up display to generate a calibration graphic upon the windscreen of the vehicle, wherein the calibration graphic includes a plurality of individual calibration patterns, each of which coincides with one of the plurality of unit exit pupils of the eyebox;
receive image data from the camera, wherein the image data captures the calibration graphic that is reflected upon the light-diffusing panel, and wherein the calibration graphic reflected upon the light-diffusing panel includes a plurality of warped individual calibration patterns;
correct distortions in each of the plurality of warped individual calibration patterns of the calibration graphic to create a plurality of corrected individual calibration patterns; and
determine a warp map based on the plurality of corrected individual calibration patterns.

15. A method for calibrating a waveguide-based holographic head-up display that projects images upon a windscreen of a vehicle, the method comprising:
instructing the waveguide-based holographic head-up display to generate a calibration graphic upon the windscreen of the vehicle by one or more controllers, wherein the calibration graphic includes a plurality of individual calibration patterns, each of which coincides with one of a plurality of unit exit pupils of an eyebox, and wherein the eyebox of the waveguide-based holographic head-up display is positioned at the center of an eyellipse of a light-diffusing panel;
receiving, by the one or more controllers, image data from a camera, wherein the image data captures the calibration graphic that is reflected upon the light-diffusing panel, and wherein the calibration graphic reflected upon the light-diffusing panel includes a plurality of warped individual calibration patterns, and wherein the light-diffusing panel is positioned at the center of the eyellipse;
correcting distortions in each of the plurality of warped individual calibration patterns of the calibration graphic to create a plurality of corrected individual calibration patterns; and
determining, by the one or more controllers, a warp map based on the plurality of corrected individual calibration patterns.

16. The method of claim 15, further comprising:
determining a misalignment of the calibration graphic relative to the center of the eyellipse.

17. The method of claim 16, further comprising:
instructing the waveguide-based holographic head-up display to align the calibration graphic with the center of the eyellipse, wherein once the calibration graphic is aligned with the center of the eyellipse, a center of each of the plurality of warped individual calibration patterns of the calibration graphic is aligned with a center of a corresponding corrected individual calibration pattern.

18. The method of claim 17, further comprising:
in response to determining the center of each of the plurality of warped individual calibration patterns is aligned with the center of the corresponding corrected individual calibration pattern, correcting distortions in a remaining portion of each of the plurality of warped individual calibration patterns of the calibration graphic.

19. The method of claim 18, further comprising:
correcting the distortions in the remaining portion of each of the warped individual calibration patterns; and by aligning a remaining portion of a plurality of alignment marks that are part of each of the warped individual calibration patterns with a plurality of alignment marks that are part of the corresponding corrected individual calibration pattern.

20. The method of claim 19, further comprising:
determining a difference in position between each of the plurality of alignment marks that are part of the warped individual calibration pattern and each of the alignment marks that are part of the corresponding corrected individual calibration pattern.

\* \* \* \* \*